(12) United States Patent
Hu et al.

(10) Patent No.: US 12,503,274 B1
(45) Date of Patent: Dec. 23, 2025

(54) THREADLESS VERTICAL LID-OPENING STRUCTURE FOR CONTAINERS

(71) Applicant: Zhejiang Coolests Technology Co., Ltd., Zhejiang (CN)

(72) Inventors: Weizhen Hu, Jinhua (CN); Changgen Ying, Jinhua (CN); Guowen Li, Jinhua (CN)

(73) Assignee: Zhejiang Coolests Technology Co., Ltd., Jinhua (CN)

( * ) Notice: Subject to any disclaimer, the term of this patent is extended or adjusted under 35 U.S.C. 154(b) by 0 days.

(21) Appl. No.: 19/275,513

(22) Filed: Jul. 21, 2025

(30) Foreign Application Priority Data

Jul. 31, 2024 (CN) .......................... 202421831105.7

(51) Int. Cl.
   *B65D 43/02* (2006.01)

(52) U.S. Cl.
   CPC ............ *B65D 43/0202* (2013.01); *B65D 2543/00601* (2013.01); *B65D 2543/00953* (2013.01)

(58) Field of Classification Search
   CPC ...... B65D 43/0202; B65D 2543/00601; B65D 2543/00953; B65D 47/36; B65D 51/18; B65D 2251/0003; B65D 2251/0006
   See application file for complete search history.

(56) References Cited

U.S. PATENT DOCUMENTS

| | | | | |
|---|---|---|---|---|
| 7,249,690 B2 * | 7/2007 | Smith | ................ | B65D 51/2835 222/153.05 |
| 8,230,777 B2 * | 7/2012 | Anson | ................ | B65D 47/243 220/501 |
| 2010/0084397 A1 * | 4/2010 | Kubo | ................ | B65D 51/1633 220/256.1 |
| 2010/0096416 A1 * | 4/2010 | Painchaud | ......... | B65D 47/2081 222/496 |
| 2011/0006071 A1 * | 1/2011 | Koumans | ........... | B65D 81/3216 220/711 |
| 2013/0248536 A1 * | 9/2013 | Prum | ...................... | A47J 43/27 222/189.07 |
| 2014/0224797 A1 * | 8/2014 | Maloney | .............. | B65D 47/243 220/212 |
| 2015/0166224 A1 * | 6/2015 | Greiner-Perth | ........ | B65D 83/00 222/522 |

(Continued)

FOREIGN PATENT DOCUMENTS

CN           117918691 A       4/2024

*Primary Examiner* — Kareen K Thomas
(74) *Attorney, Agent, or Firm* — Mei & Mark LLP; Manni Li

(57) ABSTRACT

A container having a threadless vertical lid-opening comprises a container body and a lid body. A sealing device is arranged on the lid body, the lid body is sealably arranged on the container body through the sealing device, and the sealing device comprises a base and a deformable elastic sealing element sleeved on the base. The base is provided with a pulling shaft, the lid body is provided with a movable latch switch, the latch switch and the pulling shaft are connected through a rotating member, and the lid body is further provided with a limiting block. Vertical rotation of the movable latch switch enables to engage or disengage a container lid with the container body. The latch switch is arranged to control the lid opening and closing of the container, and snap-fitted engagement with the container body enables the lid closing.

10 Claims, 6 Drawing Sheets

(56) References Cited

U.S. PATENT DOCUMENTS

2015/0232318 A1\* 8/2015 Meldeau ................ B65D 51/28
                                                    222/189.06
2016/0311589 A1\* 10/2016 Wochele ............ B65D 51/1616

\* cited by examiner

THREADLESS VERTICAL LID-OPENING STRUCTURE FOR CONTAINERS

CROSS-REFERENCE TO RELATED APPLICATIONS

The subject application claims priority on Chinese Patent Application No. CN202421831105.7, filed on Jul. 31, 2024 in China. The contents and subject matter of the Chinese priority application are incorporated herein by reference.

TECHNICAL FIELD

The present invention belongs to the technical field of containers with lids, and in particular to container having threadless vertical lid-opening structure.

BACKGROUND ART

At present, a thermal cup is a water-containing vessel generally made from a ceramic or stainless steel material and comprises a vacuum layer. A top thereof is tightly sealed by a lid, and a vacuum insulation layer delays heat dissipation of liquid such as water, thereby achieving the purpose of thermal insulation. For the purpose of seal capping, a threaded structure is usually arranged at an opening of a thermal containment shell of the thermal cup, and a lid body and the thermal containment shell are screwed tightly to achieve heat preservation.

For example, Chinese Patent Application No. CN117918691A discloses a thermal flask with a pressure-limiting valve, and the thermal flask comprises a flask lid and a flask body, where the flask lid is arranged above the flask body, an upper portion of the flask body is provided with the pressure-limiting valve communicated with inside of the flask body, the pressure-limiting valve is connected to a pressure relief switch device configured to open or close the pressure-limiting valve, and the pressure relief switch device comprises a housing with a side opening, a pressure relief switch rotating shaft, a pressure relief lever rotating shaft, a pressure relief switch, and a pressure relief lever; and the housing is arranged on the flask body, a piston at one end of the pressure-limiting valve extends into the housing, the pressure relief switch is arranged on one side of an opening of the housing, an upper end thereof is connected to a top of the housing through the pressure relief switch rotating shaft, a lower end thereof is connected to a bottom end of the pressure relief lever, the pressure relief lever is connected to a middle of the housing through the pressure relief lever rotating shaft, and a top end thereof is connected to the piston. The present invention has many advantages comprising internal steam pressure relief switch control, self-heating capability, and operational convenience.

Heat preservation of the above thermal flask is achieved through threaded engagement between the housing and the flask lid. However, for the purpose of seal capping, the user needs to rotate the lid body many times, and heat inside the thermal flask is easily dissipated during rotation, thereby leading to poor thermal performance. Additionally, in view of the cumbersome process of lid opening and closing of the thermal flask through repeated rotations, there is a need for design and improvement of a novel method for lid opening of containers.

SUMMARY OF THE INVENTION

An objective of the present invention is to provide a threadless vertical lid-opening structure for containers, with an aim to solve the technical problems of the existing technology including cumbersome lid opening and closing through threaded fastening or with both hands, and easy heat dissipation during lid opening and closing.

In order to achieve the above objective, a container comprising a threadless vertical lid-opening structure therefor is provided in the present invention, and the structure comprises a container body and a lid body; a sealing device is arranged on the lid body, the lid body is sealably arranged on the container body through the sealing device, and the sealing device comprises a base and a deformable elastic sealing element sleeved on the base; the deformable elastic sealing element is encapsulated in a mounting recess of the base to prevent operational dislocation of the deformable elastic sealing element and prevent water ingress while achieving fixing and sealing functions, the base is provided with a pulling shaft, the lid body is provided with a latch switch, the latch switch and the pulling shaft are connected through a rotating member, a guiding face is arranged inside the lid body, the rotating member and the guiding face abut against each other to rotate, an opening is formed on the guiding face, one end of the pulling shaft penetrates through the opening and is connected to the rotating member, the other end of the pulling shaft is connected to the base, and when the latch switch rotates, the rotating member is driven to rotate, and the rotating member causes the pulling shaft and the base to axially move upward or downward; and the lid body is further provided with a limiting block, and the limiting block limits flipping of the latch switch with an optimal effect.

When the base connected to the pulling shaft moves upward, the deformable elastic sealing element expands radially and bends outward to be snap-fitted with a snap-fit opening of an inner wall of the container body, thereby achieving sealed engagement between the lid body and the container body; and when the base connected to the pulling shaft moves downward, the deformable elastic sealing element retracts and disengages from the inner wall of the container body, thereby achieving disengagement between the lid body and the container body.

Optionally, the latch switch is provided with a sliding projection, a sliding groove is formed at a bottom of the limiting block, the lid body is provided with an auxiliary limiting position, the sliding projection and the sliding groove are fitted with each other, the limiting block slides between the latch switch and the auxiliary limiting position, when the limiting block is entirely located on the latch switch, the latch switch flips, and when one end of the limiting block is located on the latch switch and the other end thereof is located on the auxiliary limiting position, flipping of the latch switch is limited.

Optionally, the latch switch is provided with an elastic first projection, a second projection and a third projection that are elastic are arranged at the bottom of the limiting block, and during movement of the limiting block, the first projection, the second projection, and the third projection deform relative to each other, with changes in a positional order.

Optionally, the latch switch is provided with a first stopper block, a second stopper block is arranged at the bottom of the limiting block, and the first stopper block and the second stopper block cooperate with each other to prevent relative slippage between the limiting block and the latch switch.

Optionally, a convex rib is arranged at the auxiliary limiting position, and the convex rib is configured for ensuring that the limiting block moves smoothly without falling off.

Optionally, a clearance space is arranged at a middle of the rotating member, and one end of the pulling shaft is inserted into the clearance space and connected to the rotating member.

Optionally, the rotating member is provided with a through first insertion hole, one end of the pulling shaft is provided with a through second insertion hole, and when one end of the pulling shaft is inserted into the clearance space, the first insertion hole and the second insertion hole are aligned with each other, and an insertion pin penetrates through the first insertion hole and the second insertion hole to connect the pulling shaft with the rotating member.

Optionally, a bottom edge and a side edge of the rotating member are smooth and arc-shaped.

Optionally, a spring is sleeved on the pulling shaft, one end of the spring abuts against the base, and the other end thereof abuts against the guiding face to ensure flexible inflation and deflation of the deformable elastic sealing element.

Optionally, a filter net is further arranged at a bottom of the lid body.

Optionally, the deformable elastic sealing element is encapsulated in a mounting recess of the base to prevent operational dislocation of the deformable elastic sealing element and prevent water ingress while achieving fixing and sealing functions.

Compared to the prior art, the present invention completely achieves detachable lid cleaning and prevents dirt accumulation and bacterial growth. The present invention completely replaces two-handed lid opening with rapid single-handed lid opening and achieves simple and convenient use. The above one or more technical solutions of the threadless vertical lid-opening structure for containers provided in an example of the present invention have at least one of the following technical effects:

The latch switch is arranged in the present invention to control the lid opening and closing of the container in a simple and convenient manner, additionally the sealing device is arranged, and snap-fitted engagement with the snap-fit opening of the inner wall of the container body enables the lid closing, which prevents heat loss caused by conventional threaded sealing. Arrangement of the limiting block enables simple and rapid locking of the latch switch and prevents accidental activation of the latch switch due to unintentional touch or any other reason, thereby avoiding spillage of water from the container.

BRIEF DESCRIPTION OF THE DRAWINGS

In order to more clearly illustrate the technical solution in the examples of the present invention, the accompanying drawings required to be used in the examples or the prior art description are simply introduced below, and obviously, the accompanying drawings described below are only some examples of the present invention, such that for those of ordinary skill in the art, other drawings may further be derived from these drawings without making inventive efforts.

Figure 1:
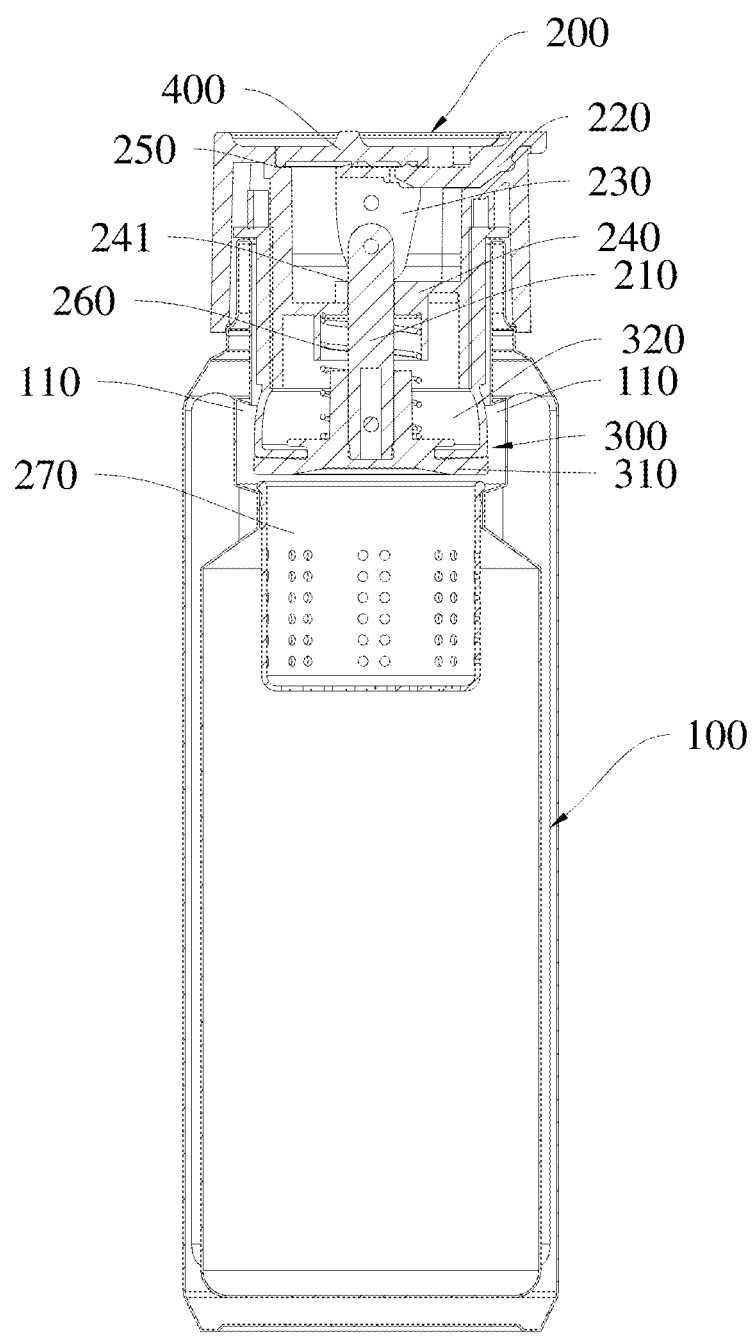
FIG. 1 is a schematic diagram of a sectional structure of the present invention.

Reference numerals in the accompanying drawings are:
100—container body; 110—snap-fit opening; 200—lid body; 210—pulling shaft; 211—second insertion hole; 220—latch switch; 221—sliding projection; 222—first projection; 223—first stopper block; 230—rotating member; 231—clearance space; 232—first insertion hole; 240—guiding face; 241—opening; 250—auxiliary limiting position; 251—convex rib; 260—spring; and 270—filter net; 300—sealing device; 310—base; 320—sealing element; 400—limiting block; 410—sliding groove; 420—second projection; 430—third projection; and 440—second stopper block.

DETAILED DESCRIPTION OF THE INVENTION

Examples of the present invention are described in detail below, and examples of the examples are shown in accompanying drawings, throughout which identical or similar reference numerals denote identical or similar elements or elements having identical or similar functions. The examples described with reference to the accompanying drawings are exemplary and only intended to explain the examples of the present invention, instead of being construed as limiting the present invention.

In an embodiment of the present invention as shown in FIGS. 1-6, a threadless vertical lid-opening structure for containers, and the structure comprises a container body 100 and a lid body 200; a sealing device 300 is arranged on the lid body 200, the lid body 200 is sealably arranged on the container body 100 through the sealing device 300, the sealing device 300 comprises a base 310 and a deformable elastic sealing element 320 sleeved on the base 310, and the base 310 is provided with a groove tightly wrapped by a lower end (i.e., a movable end) of the deformable elastic sealing element 320; the base 310 is provided with a pulling shaft 210, the lid body 200 is provided with a latch switch 220, the latch switch 220 is connected to the pulling shaft 210 through a rotating member 230, a guiding face 240 is arranged inside the lid body 200, the rotating member 230 and the guiding face 240 abut against each other to rotate, an opening 241 is formed on the guiding face 240, one end of the pulling shaft 210 penetrates through the opening 241 and is connected to the rotating member 230, the other end of the pulling shaft 210 is connected to the base 310, and when the latch switch 220 rotates, the rotating member 230 is driven to rotate, and the rotating member 230 causes the pulling shaft 210 and the base 310 to axially move upward or downward; and the lid body 200 is further provided with a limiting block 400, and the limiting block 400 limits flipping of the latch switch 220.

When the base 310 connected to the pulling shaft 210 moves upward, the deformable elastic sealing element 320 expands radially and bends outward to be snap-fitted with a snap-fit opening 110 of an inner wall of the container body 100, thereby achieving sealed engagement between the lid body 200 and the container body 100; and when the base 310 connected to the pulling shaft 210 moves downward, the deformable elastic sealing element 320 retracts and disengages from the inner wall of the container body 100, thereby achieving disengagement between the lid body 200 and the container body 100.

Specifically, during lid closing, downward flipping of the latch switch 220 drives the rotating member 230 to rotate on the guiding face 240, the rotating member 230 causes the pulling shaft 210 and the base 310 to axially move upward, and the deformable elastic sealing element 320, under the action of an extrusion force, expands radially and bends outward to be snap-fitted with the snap-fit opening 110 of the inner wall of the container body 100, thereby achieving sealed engagement between the lid body 200 and the container body 100 (single-handed operation). During lid opening, upward flipping of the latch switch 220 drives the rotating member 230 to rotate on the guiding face 240, the first rotating member 230 causes the pulling shaft 210 and the base 310 to axially move downward, and the deformable elastic sealing element 320 retracts and disengages from the inner wall of the container body 100, thereby achieving disengagement between the lid body 200 and the container body 100 (single-handed operation). The lid body 200 is further provided with the limiting block 400, and the limiting block 400 moves forward and backward to limit the flipping of the latch switch 220.

Further, the latch switch 220 is arranged in the present invention to control the lid opening and closing of the container in a simple and convenient manner, additionally the sealing device 300 is arranged, and snap-fitted engagement with the snap-fit opening 110 of the inner wall of the container body 100 enables the lid closing, which prevents heat loss caused by conventional threaded sealing. Arrangement of the limiting block 400 enables simple and rapid locking of the latch switch 220 and prevents accidental activation of the latch switch 220 due to unintentional touch, thereby avoiding spillage of water from the container.

Figure 4:
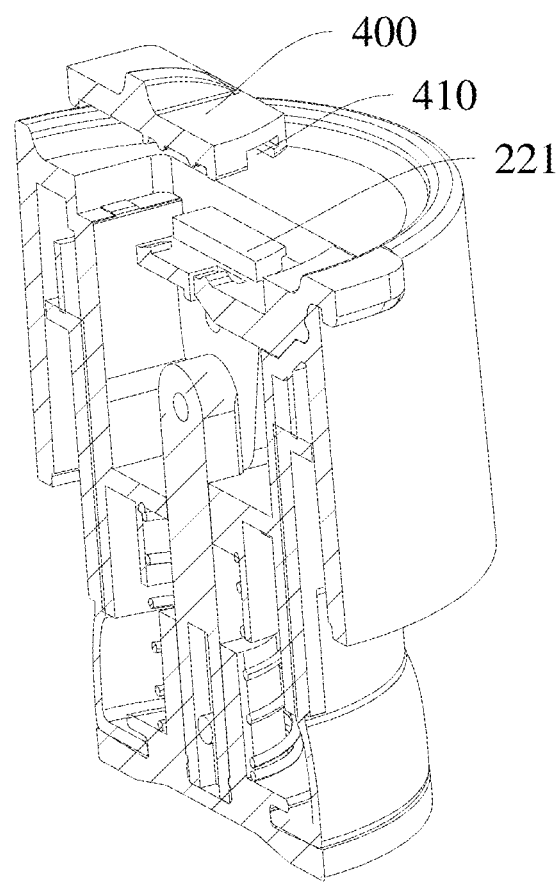
FIG. 4 is a schematic diagram III of a sectional structure of a lid body of the present invention.
Figure 5:
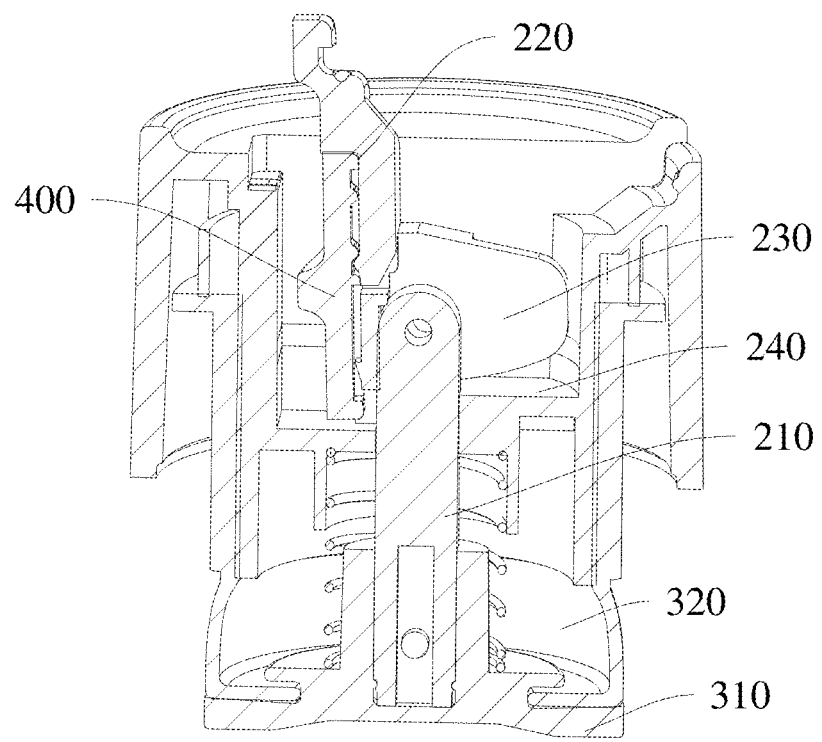
FIG. 5 is a schematic diagram IV of a sectional structure of a lid body of the present invention.

In another example of the present invention, as illustrated in FIG. 4, the latch switch 220 is provided with a sliding projection 221, a sliding groove 410 is formed at a bottom of the limiting block 400, the lid body 200 is provided with an auxiliary limiting position 250, the sliding projection 221 and the sliding groove 410 are fitted with each other, the limiting block 400 slides between the latch switch 220 and the auxiliary limiting position 250, when the limiting block 400 is entirely located on the latch switch 220, the latch switch 220 flips, and when one end of the limiting block 400 is located on the latch switch 220 and the other end thereof is located on the auxiliary limiting position 250, flipping of the latch switch 220 is limited.

Figure 2:
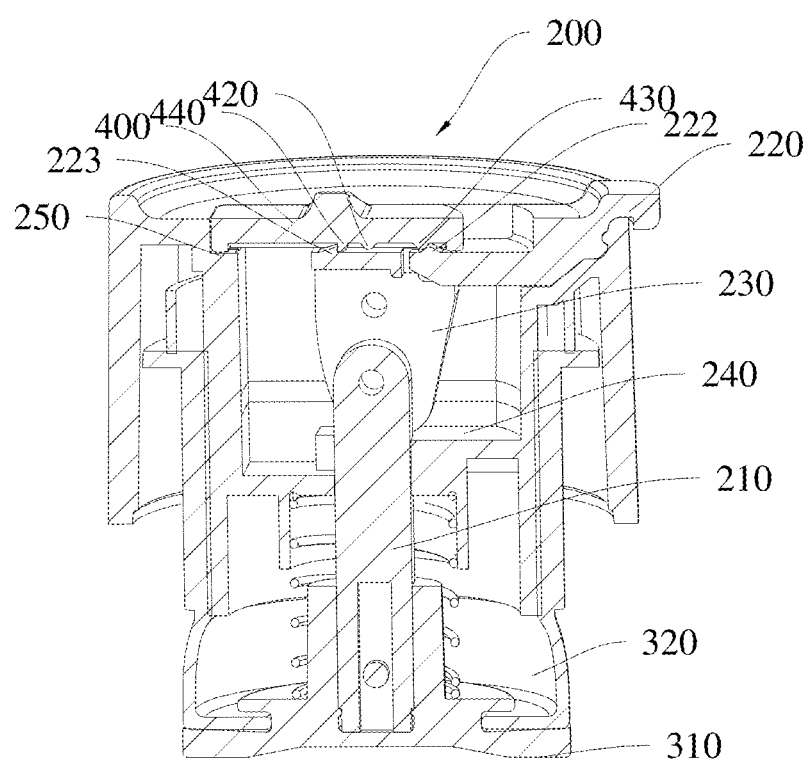
FIG. 2 is a schematic diagram I of a sectional structure of a lid body of the present invention.
Figure 3:
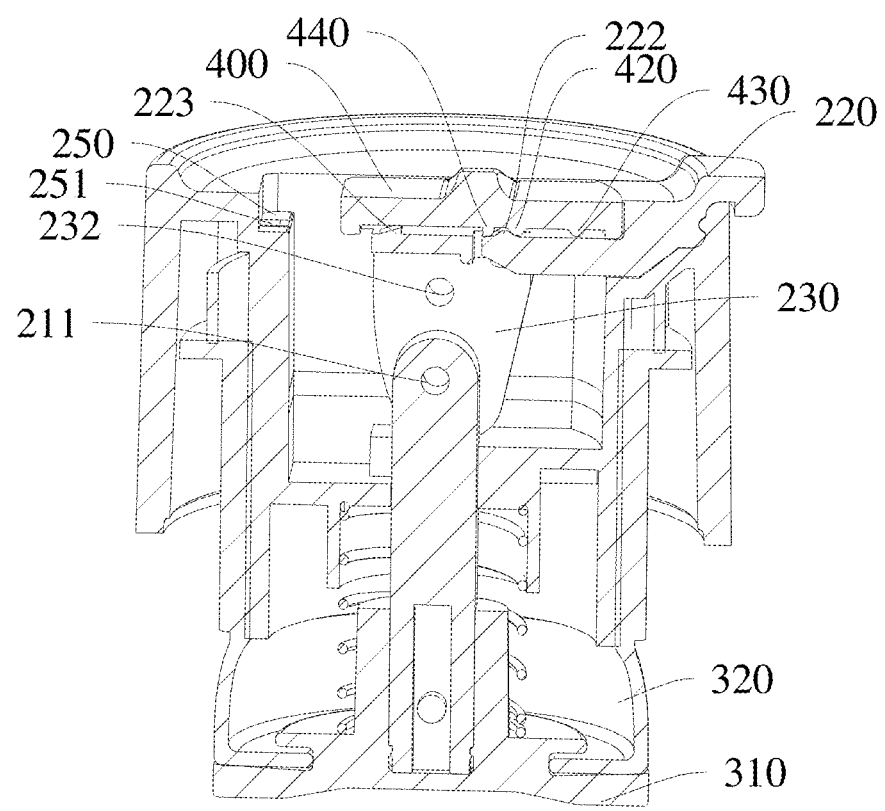
FIG. 3 is a schematic diagram II of a sectional structure of a lid body of the present invention.

Specifically, as illustrated in FIGS. 2-4, the lid body 200 is internally provided with a cavity, the guiding face 240 divides the cavity into two portions (an upper cavity and a lower cavity), the rotating member 230 is located inside the upper cavity, the sealing device 300 is located inside the lower cavity, and the pulling shaft 210 penetrates through the upper cavity and the lower cavity; when the limiting block 400 is entirely located on the latch switch 220, the latch switch 220 drives the limiting block 400 to rotate together, and when one end of the limiting block 400 is located on the latch switch 220 and the other end thereof are located at the auxiliary limiting position 250, the auxiliary limiting position 250 forms a barrier that restricts the flipping of the limiting block 400, which further limits the flipping of the latch switch 220; and in this case, the sliding projection 221 and the sliding groove 410 are to be in interference fit.

As shown in FIGS. 2-4, the latch switch 220 is provided with an elastic first projection 222, a second projection 420 and a third projection 430 that are elastic are arranged at the bottom of the limiting block 400, and during movement of the limiting block 400, the first projection 222, the second projection 420, and the third projection 430 deform relative to each other, with changes in a positional order. As shown in FIGS. 2 and 3, both the second projection 420 and the third projection 430 are located to left of the first projection 222, and a locked and limited state is achieved, that is, the first projection 222 limits the third projection 430, such that the limiting block 400 maintains a state of locking and limiting. When the user pushes the limiting block 400 hard rightwards, the second projection 420 and the third projection 430 are located right to the first projection 222, the positional order is changed with an unlocked state achieved, and in this case, the latch switch 220 is flipped, and the first projection 222 limits the second projection 420, such that the limiting block 400 maintains a state of unlocking.

The latch switch 220 is provided with a first stopper block 223, a second stopper block 440 is arranged at the bottom of the limiting block 400, and the first stopper block 223 and the second stopper block 440 cooperate with each other to prevent relative slippage between the limiting block 400 and the latch switch 220 or accidental opening, thereby achieving secondary locking security.

A convex rib 251 is arranged at the auxiliary limiting position 250, and specifically, the convex rib 251 is configured for ensuring that the limiting block 400 moves smoothly without falling off, which also enhances a damping effect during pushing.

Figure 6:
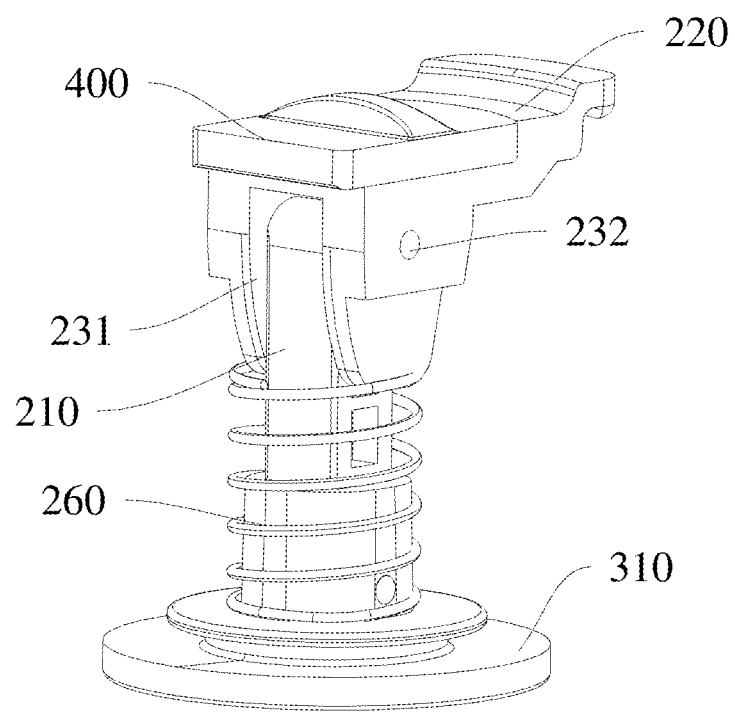
FIG. 6 is a schematic diagram of a partial structure.

In another embodiment of the present invention, as shown in FIGS. 3 and 6, a clearance space 231 is arranged at a middle of the rotating member 230, and one end of the pulling shaft 210 is inserted into the clearance space 231 and connected to the rotating member 230. The rotating member 230 is provided with a through first insertion hole 232, one end of the pulling shaft 210 is provided with a through second insertion hole 211, and when one end of the pulling shaft 210 is inserted into the clearance space 231, the first insertion hole 232 and the second insertion hole 211 are aligned with each other, and an insertion pin penetrates through the first insertion hole 232 and the second insertion hole 211 to connect the pulling shaft 210 with the rotating member 230. Specifically, the clearance space 231 is arranged at the middle of the rotating member 230, one end of the pulling shaft 210 is inserted into the clearance space 231 and connected to the rotating member 230, and this connection method ensures structural stability while saving space.

In another embodiment of the present invention, as shown in FIGS. 1-5, the rotating member 230 is an elastic member, and a bottom edge and a side edge of the rotating member 230 are smooth and arc-shaped. Specifically, the smooth and arc-shaped bottom edge and side edge of the rotating member 230 facilitate smooth sliding against the guiding face 240, and ensure smoother rotation of the rotating member 230, and smoother opening and closing of the lid body 200.

In another embodiment of the present invention, as illustrated in FIGS. 1-5, a spring 260 is sleeved on the pulling shaft 210, one end of the spring 260 abuts against the base 310, and the other end thereof abuts against the guiding face 240. Specifically, the spring 260 is designed to assist in resetting, when the pulling shaft 210 and the base 310 axially move upward, the spring 260 is compressed to generate a restoring force, and a big force is required to turn off the latch switch 220, with the damping effect achieved. During the lid opening, the pulling shaft 210 moves downward in an accelerated manner, and the deformable elastic sealing element 320 retracts and disengages from the inner wall of the container body 100 in an accelerated manner. Additionally, a snap-fit member is arranged along an edge of the latch switch 220 and the lid body 200, and for example, a snap-fit projection is arranged on the latch switch 220, a snap-fit groove is formed along the edge of the lid body 200, or alternatively, a snap-fit groove is formed on the latch switch 220.

In another embodiment of the present invention, as shown in FIG. 1, a filter net 270 is further arranged at a bottom of the lid body 200. Specifically, the filter net 270 is configured for filtering tea leaves, herbal supplements, and other tea products, thereby achieving solid-liquid separation.

We claim:

1. A container with a threadless vertical lid-opening structure, comprising
    a container body,
    a lid body,
    a sealing device, wherein the sealing device is arranged on the lid body and comprises a base and a deformable elastic sealing element sleeved on the base,
    wherein the lid body is sealably arranged on the container body through the sealing device;
    the base is provided with a pulling shaft, the lid body is provided with a latch switch, the latch switch and the pulling shaft are connected through a rotating member, a guiding face is arranged inside the lid body, the rotating member and the guiding face abut against each other to rotate, an opening is formed on the guiding face, one end of the pulling shaft penetrates through the opening and is connected to the rotating member, the other end of the pulling shaft is connected to the base, and when the latch switch rotates, the rotating member is driven to rotate, and the rotating member causes the pulling shaft and the base to axially move upward or downward; the lid body is further provided with a limiting block, and the limiting block limits flipping of the latch switch with an optimal effect; and
    when the base connected to the pulling shaft moves upward, the deformable elastic sealing element expands radially and bends outward to be snap-fitted with a snap-fit opening of an inner wall of the container body, thereby achieving sealed engagement between the lid body and the container body; and when the base connected to the pulling shaft moves downward, the deformable elastic sealing element retracts and disengages from the inner wall of the container body, thereby achieving disengagement between the lid body and the container body.

2. The container according to claim 1, wherein the latch switch is provided with a sliding projection, a sliding groove is formed at a bottom of the limiting block, the lid body is provided with an auxiliary limiting position, the sliding projection and the sliding groove are fitted with each other, the limiting block slides between the latch switch and the auxiliary limiting position, when the limiting block is entirely located on the latch switch, the latch switch flips, and when one end of the limiting block is located on the latch switch and the other end thereof is located on the auxiliary limiting position, flipping of the latch switch is limited.

3. The container according to claim 2, wherein the latch switch is provided with an elastic first projection, a second projection and a third projection that are elastic are arranged at the bottom of the limiting block, and during movement of the limiting block, the first projection, the second projection, and the third projection deform relative to each other, with changes in a positional order.

4. The container according to claim 3, wherein the latch switch is provided with a first stopper block, a second stopper block is arranged at the bottom of the limiting block, and the first stopper block and the second stopper block cooperate with each other to prevent relative slippage between the limiting block and the latch switch.

5. The container according to claim 2, wherein a convex rib is arranged at the auxiliary limiting position, and the convex rib is configured for ensuring that the limiting block moves smoothly without falling off.

6. The container according to claim 1, wherein a clearance space is arranged at a middle of the rotating member, and one end of the pulling shaft is inserted into the clearance space and connected to the rotating member.

7. The container according to claim 6, wherein the rotating member is provided with a through first insertion hole, one end of the pulling shaft is provided with a through second insertion hole, and when one end of the pulling shaft is inserted into the clearance space, the first insertion hole and the second insertion hole are aligned with each other, and an insertion pin penetrates through the first insertion hole and the second insertion hole to connect the pulling shaft with the rotating member.

8. The container according to claim 1, wherein a bottom edge and a side edge of the rotating member are smooth and arc-shaped.

9. The container according to claim 1, wherein a spring is sleeved on the pulling shaft, one end of the spring abuts against the base, and the other end of the spring abuts against the guiding face.

10. The container according to claim 1, wherein a filter net is further arranged at a bottom of the lid body.

\* \* \* \* \*